(12) United States Patent
Kern

(10) Patent No.: US 9,488,113 B2
(45) Date of Patent: Nov. 8, 2016

(54) GASEOUS FUEL ENGINE AND METHOD OF OPERATING

(71) Applicant: Robert Bosch GmbH, Stuttgart (DE)

(72) Inventor: Justin Michael Kern, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 14/642,080

(22) Filed: Mar. 9, 2015

(65) Prior Publication Data

US 2016/0265449 A1    Sep. 15, 2016

(51) Int. Cl.
| | | |
|---|---|---|
| F02M 57/00 | (2006.01) | |
| F02D 19/02 | (2006.01) | |
| F02M 57/04 | (2006.01) | |
| F02M 35/104 | (2006.01) | |
| F02M 35/10 | (2006.01) | |

(52) U.S. Cl.
CPC .......... *F02D 19/021* (2013.01); *F02M 35/104* (2013.01); *F02M 35/10039* (2013.01); *F02M 57/04* (2013.01)

(58) Field of Classification Search
CPC .............. F02D 19/021; F02M 35/104; F02M 35/10039; F02M 57/04
See application file for complete search history.

(56) References Cited

U.S. PATENT DOCUMENTS

| | | | |
|---|---|---|---|
| 4,936,280 A | 6/1990 | Langlois | |
| 5,379,740 A | 1/1995 | Moore et al. | |
| 5,408,978 A * | 4/1995 | Davis | F02M 21/042 123/527 |
| 5,465,699 A * | 11/1995 | Voigt | F02M 35/10085 123/470 |
| 5,526,797 A * | 6/1996 | Stokes | F02D 15/04 123/525 |
| 5,775,282 A | 7/1998 | Smith | |
| 5,832,905 A | 11/1998 | King et al. | |
| 6,003,478 A * | 12/1999 | Huber | F02B 7/06 123/27 GE |
| 6,321,694 B1 * | 11/2001 | Vergine | F02B 69/02 123/27 GE |
| 6,543,423 B2 * | 4/2003 | Dobryden | F02D 19/061 123/1 A |
| 7,412,966 B2 * | 8/2008 | Lewis | F02D 41/0025 123/1 A |
| 7,546,834 B1 * | 6/2009 | Ulrey | F02D 19/0628 123/525 |
| 7,647,916 B2 * | 1/2010 | Leone | F02M 26/01 123/25 E |
| 7,712,451 B2 | 5/2010 | Hung et al. | |
| 7,918,207 B2 * | 4/2011 | Pursifull | F02D 41/20 123/299 |
| 8,091,536 B2 * | 1/2012 | Munshi | C10L 3/06 123/525 |
| 8,393,312 B2 * | 3/2013 | Lewis | F02D 41/0025 123/299 |
| 8,402,928 B2 * | 3/2013 | Leone | F01N 5/02 123/3 |
| 9,080,517 B2 * | 7/2015 | Guido | F02D 19/0602 |
| 2009/0071453 A1 * | 3/2009 | Stockhausen | F02D 19/081 123/577 |
| 2013/0104848 A1 | 5/2013 | Klyza et al. | |

(Continued)

FOREIGN PATENT DOCUMENTS

DE    102012209030    12/2013

*Primary Examiner* — Hieu T Vo
*Assistant Examiner* — Sherman Manley
(74) *Attorney, Agent, or Firm* — Michael Best & Friedrich LLP

(57) ABSTRACT

An engine includes one or more cylinders configured to receive gaseous fuel for use in combustion. Two gaseous fuel injectors per cylinder, include: a first injector directed at the corresponding cylinder and having an injection capacity of a first amount of gaseous fuel per injection, and a second injector directed at the corresponding cylinder and having an injection capacity of a second amount of gaseous fuel per injection, the second amount being greater than the first amount. The engine is operable in a first mode in which a per-cylinder fuel demand is at or below the first amount, and only the first injector is operable for each cylinder. The engine is operable in a second mode in which the per-cylinder fuel demand is greater than the first amount, and only the second injector is operable for each cylinder.

20 Claims, 4 Drawing Sheets

(56) References Cited

U.S. PATENT DOCUMENTS

| | | |
|---|---|---|
| 2013/0213358 A1 | 8/2013 | Hou |
| 2013/0319373 A1 | 12/2013 | Brown et al. |
| 2014/0114552 A1 | 4/2014 | Cherniak et al. |
| 2014/0156174 A1 | 6/2014 | Lee et al. |
| 2014/0182551 A1 | 7/2014 | Steffen et al. |
| 2014/0182554 A1 | 7/2014 | Lee et al. |
| 2014/0196687 A1 | 7/2014 | Coldren et al. |
| 2014/0202430 A1 | 7/2014 | Monros et al. |
| 2014/0230793 A1 | 8/2014 | Mashiki et al. |

* cited by examiner

FIG. 1 --PRIOR ART--

GASEOUS FUEL ENGINE AND METHOD OF OPERATING

BACKGROUND OF THE INVENTION

The present invention relates to gaseous fuel engines with fuel injectors for introducing gaseous fuel (i.e., fuel that naturally exists in a gaseous state, rather than a liquid state) into intake ports of an internal combustion engine, for example in a passenger vehicle. Gaseous fuels include natural gas (primarily methane) and derivatives thereof, such as butane and propane, but do not include gasoline. Natural gas can be used to power internal combustion engines. Compared to conventional engines, vehicles run on natural gas are environmentally friendly while outputting less engine noise than traditional diesel-powered engines.

SUMMARY OF THE INVENTION

The invention provides, in one aspect, an engine having one or more cylinders configured to receive gaseous fuel for use in combustion. Two gaseous fuel injectors, per cylinder, are directed at each of the plurality of cylinder. A first injector has an injection capacity of a first amount of gaseous fuel per injection. A second injector has an injection capacity of a second amount of gaseous fuel per injection, the second amount being greater than the first amount. The engine is operable in a first mode in which a per-cylinder fuel demand is at or below the first amount, and only the first injector is operable for each cylinder. The engine is operable in a second mode in which the per-cylinder fuel demand is greater than the first amount, and only the second injector is operable for each cylinder.

The invention provides, in another aspect, a method of operating a gaseous fuel engine having one or more cylinders. Two injectors are provided per cylinder: a first injector and a second injector. An engine load is analyzed. In a first mode of operation, gaseous fuel is injected into each cylinder via only the corresponding first injector when the engine load requires an amount of gaseous fuel that is less than or equal to a first amount. In a second mode gaseous fuel is injected into each cylinder via only the corresponding second injector when the engine load requires a second amount of gaseous fuel, greater than the first amount.

The invention provides, in yet another aspect, a method of operating a gaseous fuel engine having one or more cylinders. Two gaseous fuel injectors are provided per cylinder: a first injector and a second injector. The second injector has a higher injection capacity than an injection capacity of the first injector. An intake valve per cylinder is configured to transition between a closed position and an open position. An intake valve opening duration, in which the intake valve is in the open position, is analyzed. Gaseous fuel is injected into each cylinder only within the corresponding intake valve opening duration. The injection of gaseous fuel includes injecting gaseous fuel into each cylinder via only the corresponding first injector in a first mode of engine operation when the intake valve opening duration is greater than a predetermined duration. The injection of gaseous fuel further includes injecting gaseous fuel into each cylinder via only the corresponding second injector in a second mode of operation when the intake valve opening duration is less than the predetermined valve opening duration.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
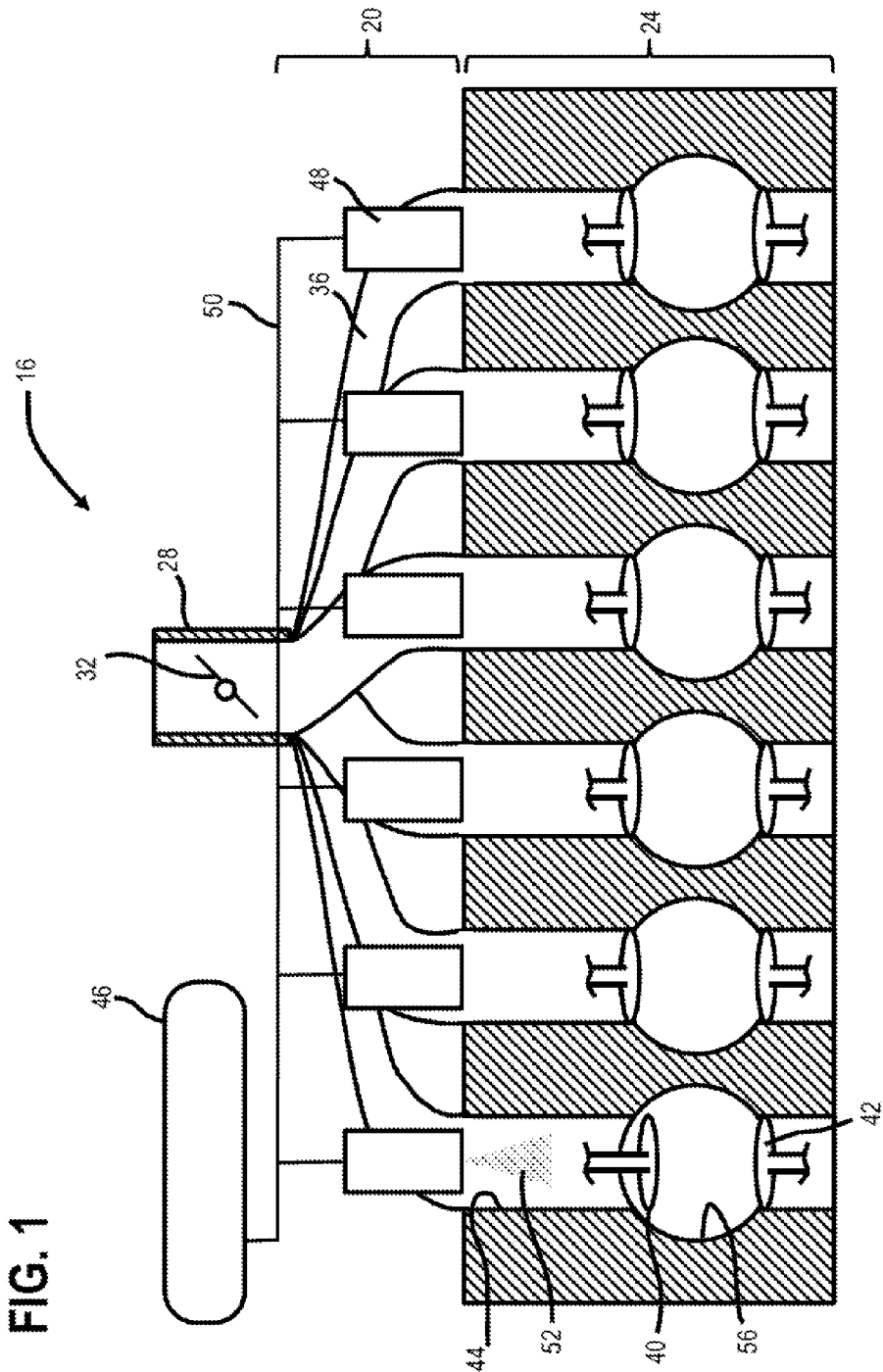
FIG. 1 is a schematic representation of a conventional engine having fuel injectors positioned at the downstream ends of individual intake runners.

Gaseous fuel engines may begin with an engine designed for more common fuels such as diesel fuel or gasoline. Components of these engines are retrofitted to allow the engine to run on a gaseous fuel. FIG. 1 shows an engine 16 including an intake manifold 20 and a cylinder head 24 of a known configuration. Air enters the intake manifold 20 via the throttle body 28. A throttle valve 32 located within the throttle body 28 selectively opens and closes to limit or prevent the passage of air through the throttle body 28. The air within the throttle body is diverted through numerous intake runners 36 (i.e., one intake runner 36 per piston cylinder 56). The intake runners 36 align with intake ports 44 within the cylinder head 24. Fuel is provided from a single gaseous fuel tank or common fuel supply 46, through a fuel line 50, to multiple fuel injectors 48. A fuel injector 48 is outfitted to inject fuel 52 into each of the respective intake ports 44. The injected fuel 52 mixes with the air to create an air-fuel mixture. An intake valve 40, located within each intake port 44 selectively prohibits the air-fuel mixture from reaching a piston cylinder 56 when the intake valve 40 is in a closed position. When the intake valve 40 is in an open position (i.e., intake stroke, suction stroke), the air-fuel mixture enters the piston cylinder 56 where combustion occurs. An exhaust valve 42 is located downstream of each cylinder 56 and is configured to open after combustion has occurred.

Figure 2:
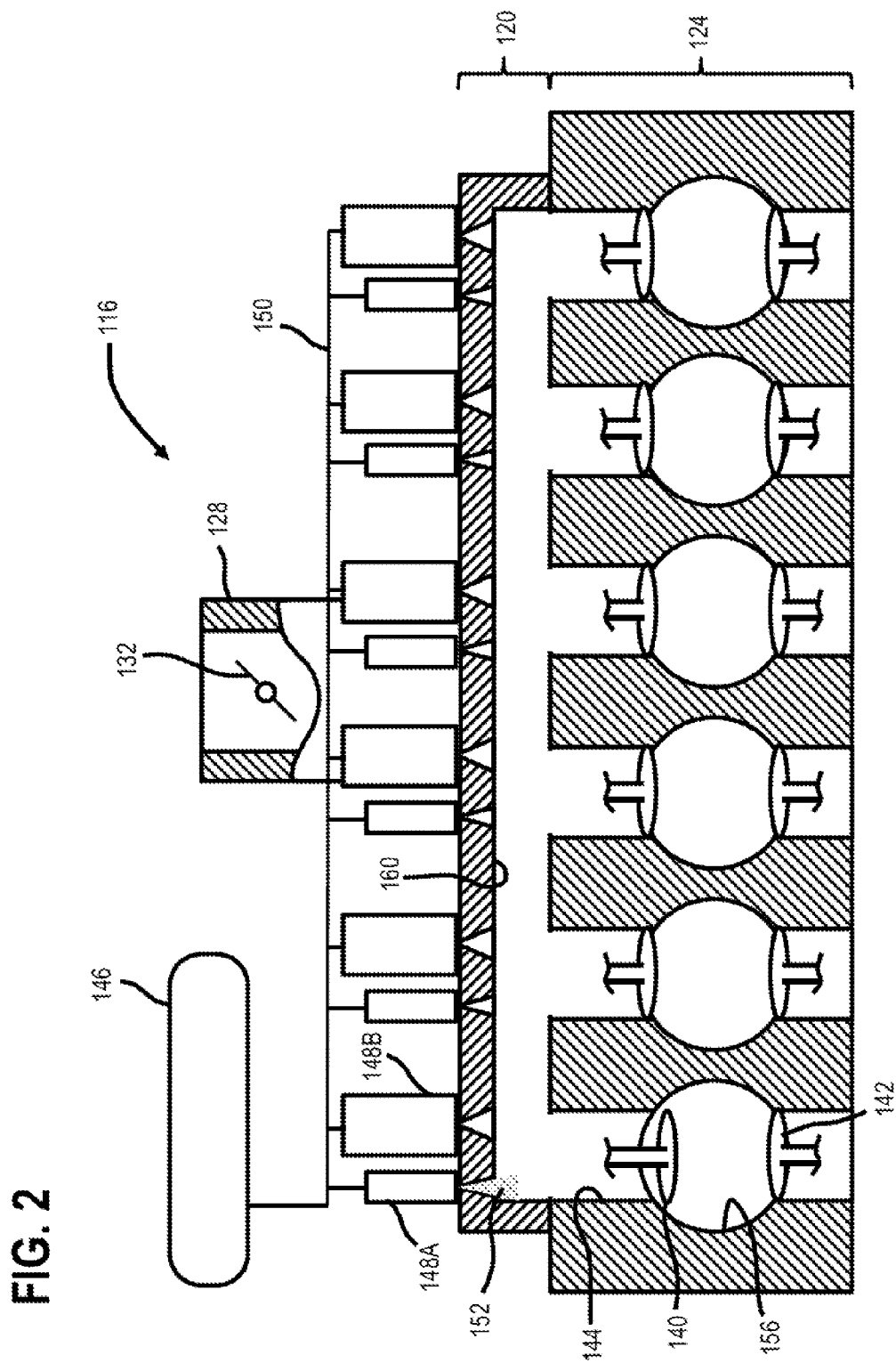
FIG. 2 is a schematic representation of an engine utilizing a first injector according to one embodiment of the present invention.
Figure 3:
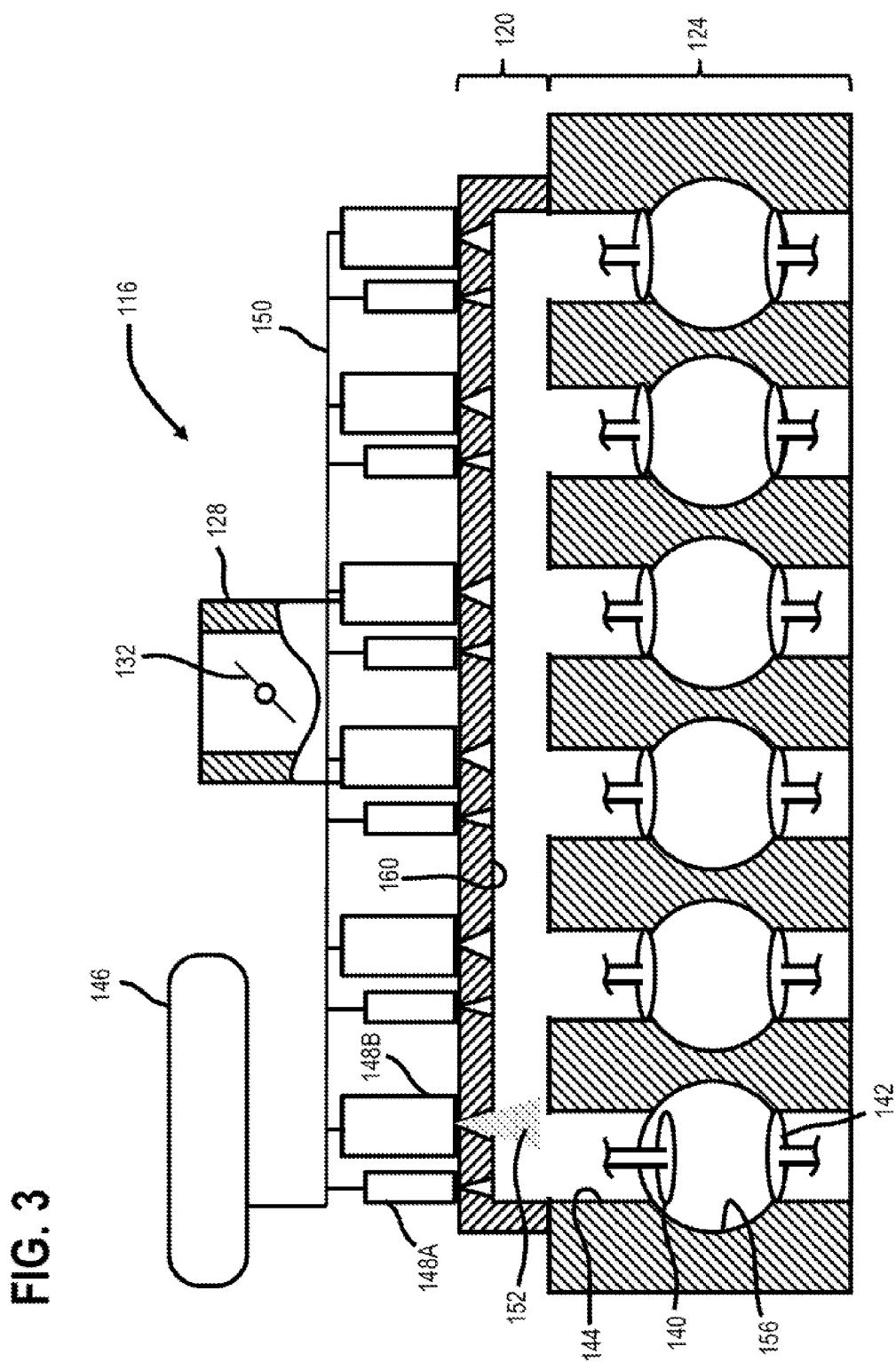
FIG. 3 is a schematic representation of an engine utilizing a second injector according to one embodiment of the present invention.

Certain engines, such as some diesel engines, do not have individual intake runners, but rather include a common intake plenum 160, such as the engine 116 as shown in FIGS. 2-3. The common intake plenum 160 is located directly downstream of the throttle body 128 and throttle valve 132, upstream of the multiple intake ports 144, and provides a fluid communication path between the multiple piston cylinders 156. As shown in FIGS. 2 and 3, the engine 116 can include six intake ports 144 for six piston cylinders 156, however, the present invention equally applies to any number of piston cylinders 156 of an engine 116 with a number of cylinders (i.e., at least one piston cylinder 156), and any number of intake ports 144 per piston cylinder 156.

A gaseous fuel engine utilizes gaseous fuel injectors 148A, 148B. For example, an engine 116 may be retrofitted to run on the gaseous fuel (i.e., natural gas). Fuel is provided from a single gaseous fuel tank or common fuel supply 146, through a fuel line 150, to multiple fuel injectors 148A, 148B. Fuel injectors 148A, 148B, are positioned to inject fuel into the common intake plenum 160, and are aligned with the intake ports 144. Therefore, in use, the fuel injectors direct the injected fuel 152 towards the corresponding intake port 144. Alternatively, the injectors 148A, 148B may inject downstream of the common intake plenum yet upstream of a corresponding intake valve 140. However, with a gaseous fuel 152 and a common intake plenum 160, it is possible that injected fuel 152 can travel through the common intake plenum 160 to additional intake ports 144. This can increase the amount of injected gaseous fuel 152 in some intake ports 144 and decrease the amount in others. This inconsistency can lead to poor combustion within the piston cylinders 156. Therefore, in certain embodiments, open valve injection is implemented.

With open valve injection, fuel 152 is injected towards the intake ports 144 of the cylinder head 124 only when the corresponding intake valve 140 is open. This prevents or at least limits the amount of injected fuel 152 which bounces off a closed intake valve 140 and spreads through the common intake plenum 160. The fuel 152 mixes with a flow of intake air which is provided through the throttle body 128, is selectively throttled via the throttle valve 132, and mixes with the injected fuel 152 in the common intake plenum 160. However, in order to supply the largest fuel demand of the engine 116 within an intake valve opening duration (i.e., the time that the intake valve 140 is in an open position), a second fuel injector 148B, distinct from the first injector 148A, with a sufficiently large flow capacity is provided for each cylinder 156. The second fuel injectors 148B may not be suitable for injecting very small amounts of fuel 152 when the engine 116 is running at idle or with a low load. Therefore, an additional injector, a first gaseous fuel injector 148A is provided.

The injectors 148A, 148B may be operated at a variable energizing time which varies the quantity of injected fuel 152 per injection, up to a maximum capacity. For given operating conditions of the engine 116, the first gaseous fuel injectors 148A have an injection capacity of a first amount of gaseous fuel per injection and are limited to injecting no more than the first amount. FIG. 2 shows a first operational mode of the engine 116 in which only the first injector 148A is in operation for each of the cylinders 156. Under the same operating conditions of the engine 116, the second gaseous fuel injectors 148B have an injection capacity of a second amount of gaseous fuel 152 per injection. The second gaseous fuel injectors 148B are limited to injecting no more than the second amount. FIG. 3 shows a second operational mode of the engine 116 in which only the second injector 148B is in operation for each of the cylinders 156. The second amount is greater than the first amount. However, the first and second fuel injectors 148A, 148B are not configured to simultaneously inject, rather, a control unit (not shown) determines which fuel injector 148A, 148B to use.

Figure 4:
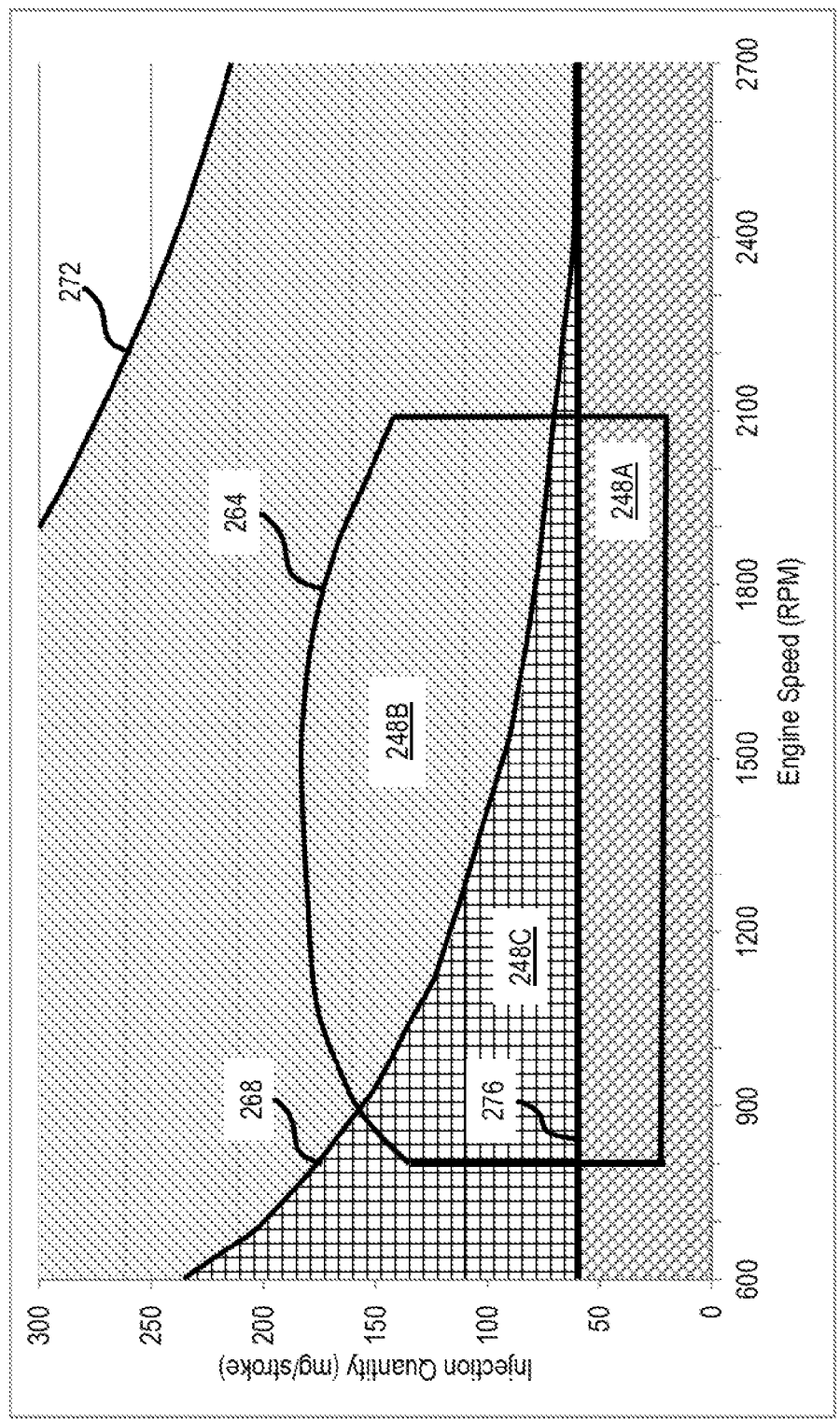
FIG. 4 is a graph illustrating an exemplary group of operational ranges of the engine of FIGS. 2-3, according to fuel injection quantity and engine speed. The graph illustrates distinct regions of operation for first and second gaseous fuel injectors, according to an exemplary method of the present invention.

As shown in FIG. 4, injection quantity is plotted against engine speed, for an exemplary set of operating conditions (e.g., 7 bar inlet pressure; 120 crank angle degrees; maximum injection duration). At these conditions, the engine 116 may operate within a specific range 264. A first mode 248A, indicated by a diagonal cross-hatch, specifies engine loads at which the first injector 148A injects a quantity of gaseous fuel 152. The second injector 148B is not capable of accurately injecting the amount of gaseous fuel 152 desired in the first area 248A. A second mode 248B, indicated by a stippling, specifies engine loads at which the second injector 148B injects a quantity of gaseous fuel 152. The first injector 148A is not capable of injecting the amount of gaseous fuel 152 desired in the second area 248B. A third mode 248C, indicated by a cross-hatch, specifies engine loads at which both the first injector 148A and the second injector 148B are capable of injecting the requested quantity of gaseous fuel 152. The control unit determines which fuel injector 148A, 148B to use, and the gaseous fuel 152 is injected with one of the two injectors 148A, 148B. If the fuel demand falls within the third mode, the control unit (not shown) may default to continue injecting with the injector used in the previous injection.

The line 268 represents a first amount, which is the upper limit of the first injector 148A, wherein, at the specified conditions, the first injector 148A is unable to inject more fuel per injection. The line 272 represents a second amount, which is the upper limit of the second injector 148B, wherein, at the specified conditions, the second injector 148B is unable to inject more fuel per injection. The line 276 represents a third amount, which is a non-zero lower limit of the second injector 148B. The third amount is defined as the smallest injection target amount at which the second injector 148B can meet the target within a predetermined acceptable range (e.g., less than 5 percent deviation from the specified target amount, less than 1 percent deviation from the specified target amount, etc.).

The intake valve 140 of each cylinder 156 transitions between an open position and a closed position in controlled relation to the crankshaft rotation and piston stroke. An intake valve opening duration is a length of time in which each of the intake valves 140 is in the open position. The intake valve opening duration will generally decrease as the operating speed of the engine 116 is increased. This assumes that each intake valve 140 is held open for a consistent number of crank angle degrees, however, this parameter may be variable (e.g., corresponding to an engine equipped with variable valve control). The intake valve opening duration provides a restriction, which limits the amount of fuel 152 which can be provided to the cylinder 140. As an alternative to, or in combination with engine-load dependent injection, as shown in FIG. 4, the control unit can determine which fuel injector 148A, 148B is appropriate for injecting the gaseous fuel 152 based on the intake valve opening duration.

The first injector 148A injects gaseous fuel 152 into the respective piston cylinder 156 when the engine 116 is operating with a first intake valve opening duration. The second injector 148B injects gaseous fuel 152 into the respective piston cylinder 156 when the engine 116 is operating with a second intake valve opening duration, less than the first intake valve opening duration. Therefore, when the intake valve 140 is open for a short duration, in which the first injector 148A is unable to inject a requested amount of fuel, the second injector 148B, with a higher injection capacity than the first injector 148A, injects the gaseous fuel 152.

When the engine 116 is operating with a third intake valve opening duration, in which either of the first and the second fuel injectors 148A, 148B are configured to inject, the control unit determines which fuel injector 148A, 148B to use, and the gaseous fuel 152 is injected with one of the two injectors 148A, 148B. If the engine 116 is operating with the third intake valve opening duration, the control unit (not shown) may continue injection with the injector used in the previous injection.

What is claimed is:

1. An engine comprising:
one or more cylinders, each cylinder being configured to receive gaseous fuel for use in combustion; and
two gaseous fuel injectors per cylinder, including: a first injector directed at the corresponding cylinder and having an injection capacity of a first amount of gaseous fuel per injection, and a second injector directed at the corresponding cylinder and having an injection capacity of a second amount of gaseous fuel per injection, the second amount being greater than the first amount,
wherein the engine is operable in a first mode in which a fuel demand is at or below the first amount, and only the first injector is operable for each cylinder, and
wherein the engine is operable in a second mode in which the fuel demand is greater than the first amount, and only the second injector is operable for each cylinder.

2. The engine of claim 1, wherein each cylinder includes at least one intake valve, and, for each cylinder, both the first injector and the second injector are located upstream of the corresponding at least one intake valve.

3. The engine of claim 2, wherein all of the gaseous fuel injectors of the engine are in fluid communication with a common fuel supply having a supply pressure incident upon all of the gaseous fuel injectors.

4. The engine of claim 3, wherein the injection capacity of each of the first and second fuel injectors is the maximum amount of fuel that can be injected within an intake valve opening duration of the at least one intake valve, given the supply pressure.

5. The engine of claim 2, wherein the engine is a multi-cylinder engine further comprising a common intake plenum in fluid communication with every cylinder of the engine, the intake plenum being provided without individual runners to each of the cylinders.

6. The engine of claim 5, further comprising a throttle body, wherein the common intake plenum is positioned between the throttle body and a number of intake ports associated with respective ones of the cylinders.

7. The engine of claim 1, wherein the engine is operable in a third mode in which the per-cylinder fuel demand is at or below the first amount and only the second injector is operable.

8. A method of operating a gaseous fuel engine having one or more cylinders, the method comprising:
providing two injectors per cylinder, including: a first injector and a second injector;
analyzing an engine load;
in a first mode of operation, injecting gaseous fuel into each cylinder via only the corresponding first injector when the engine load requires an amount of gaseous fuel that is less than or equal to a first amount; and
in a second mode of operation, injecting gaseous fuel into each cylinder via only the corresponding second injector when the engine load requires a second amount of gaseous fuel that is greater than the first amount.

9. The method of claim 8, further comprising:
providing at least one intake valve per cylinder to selectively permit fluid communication between each cylinder and the corresponding two injectors,
wherein, in both the first mode of operation and the second mode of operation, the injection of gaseous fuel into each cylinder is carried out only within an intake valve opening duration of the at least one intake valve.

10. The method of claim 9, further comprising providing all of the gaseous fuel injectors of the engine in fluid communication with a common fuel supply having a supply pressure incident upon all of the gaseous fuel injectors.

11. The method of claim 10, wherein the second fuel injectors have an injection capacity that is greater than an injection capacity of the first injectors, the injection capacities defined as the maximum amount of fuel that can be injected within the corresponding intake valve opening duration, given the supply pressure.

12. The method of claim 8, further comprising:
providing the engine with a plurality of cylinders; and
providing a common intake plenum, in fluid communication with every one of the plurality of cylinders, without individual runners to each of the cylinders,
wherein injecting gaseous fuel into each of the number of cylinders includes injecting gaseous fuel for all of the cylinders of the engine into the common intake plenum.

13. The method of claim 12, further comprising providing a flow of intake air to the common intake plenum, and throttling the flow of intake air upstream of the common intake plenum.

14. The method of claim 8, further comprising:
in a third mode of operation, injecting gaseous fuel into each cylinder via only the corresponding second injector when the engine load requires an amount of gaseous fuel which is at or below the first amount.

15. A method of operating a gaseous fuel engine having one or more cylinders, the method comprising:
providing two gaseous fuel injectors per cylinder, including: a first injector and a second injector, wherein the second injector has a higher injection capacity than an injection capacity of the first injector;
providing an intake valve per cylinder configured to transition between a closed position and an open position;
analyzing an intake valve opening duration in which the intake valve is in the open position; and
injecting gaseous fuel into each cylinder only within the corresponding intake valve opening duration, the injection of gaseous fuel including:
injecting gaseous fuel into each cylinder via only the corresponding first injector in a first mode of engine operation when the intake valve opening duration is greater than a predetermined duration; and
injecting gaseous fuel into each cylinder via only the corresponding second injector in a second mode of operation when the intake valve opening duration is less than the predetermined valve opening duration.

16. The method of claim 15, the method further comprising:
providing the engine with a plurality of cylinders; and
providing a common intake plenum, in fluid communication with every one of the plurality of cylinders, without individual runners to each of the cylinders,
wherein injecting gaseous fuel into each cylinder includes injecting gaseous fuel for all of the cylinders of the engine into the common intake plenum.

17. The method of claim 16, further comprising providing a flow of intake air to the common intake plenum, and throttling the flow of intake air upstream of the common intake plenum.

18. The method of claim 15, further comprising providing all of the gaseous fuel injectors of the engine in fluid communication with a common fuel supply having a supply pressure incident upon all of the gaseous fuel injectors.

19. The method of claim 18, wherein the injection capacity of each of the first and second fuel injectors is the maximum amount of fuel that can be injected within the corresponding intake valve opening duration, given the supply pressure.

20. The method of claim 15, further comprising injecting gaseous fuel into each cylinder via only the corresponding second injector in a third mode of engine operation when the intake valve opening duration is greater than the predetermined duration.

* * * * *